(12) United States Patent
Michaelides et al.

(10) Patent No.: US 11,088,579 B2
(45) Date of Patent: Aug. 10, 2021

(54) ROTOR FOR AN ELECTRIC MACHINE

(71) Applicant: Jaguar Land Rover Limited, Coventry (GB)

(72) Inventors: Alexandros Michaelides, Coventry (GB); Raymond William Long, Coventry (GB); Mohammad Kimiabeigi, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 613 days.

(21) Appl. No.: 16/069,369

(22) PCT Filed: Dec. 14, 2016

(86) PCT No.: PCT/EP2016/081078
§ 371 (c)(1),
(2) Date: Jul. 11, 2018

(87) PCT Pub. No.: WO2017/121567
PCT Pub. Date: Jul. 20, 2017

(65) Prior Publication Data
US 2019/0027983 A1     Jan. 24, 2019

(30) Foreign Application Priority Data
Jan. 14, 2016   (GB) ..................................... 1600711

(51) Int. Cl.
*H02K 1/27*   (2006.01)
(52) U.S. Cl.
CPC .......... *H02K 1/2773* (2013.01); *H02K 1/276* (2013.01); *H02K 1/2766* (2013.01)

(58) Field of Classification Search
CPC ..... H02K 1/276; H02K 1/2766; H02K 1/2773
(Continued)

(56) References Cited

U.S. PATENT DOCUMENTS

| 6,064,132 A | 5/2000 | Nose |
| 2012/0001511 A1 | 1/2012 | Matt et al. |

(Continued)

FOREIGN PATENT DOCUMENTS

| CN | 1770593 A | 5/2006 |
| CN | 101946391 A | 1/2011 |

(Continued)

OTHER PUBLICATIONS

First Office Action and English language translation, CN Application No. 201680078820.X, dated Aug. 23, 2019, 26 pages.

(Continued)

*Primary Examiner* — Gary A Nash
(74) *Attorney, Agent, or Firm* — McCoy Russell LLP

(57) ABSTRACT

The present disclosure relates to a rotor (3) for an electric machine (1). The rotor (3) is composed of a support frame (5) having a centre section (8) and a plurality of spokes (9). The spokes (9) extend outwardly from the centre section (8). The spokes (9) each have at least first and second bridge elements (12A, 12B) formed by one or more flux barrier (13). The first and second bridge elements (12A, 12B) are configured to control magnetic flux leakage into said centre section (8). The present disclosure also relates to an electric machine (1) having a rotor (3) of this type.

19 Claims, 12 Drawing Sheets

(58) Field of Classification Search
USPC ............. 310/156.01, 156.07, 156.53, 156.57
See application file for complete search history.

(56) References Cited

U.S. PATENT DOCUMENTS

| | | | |
|---|---|---|---|
| 2012/0274168 A1 | 11/2012 | Holzner et al. | |
| 2013/0221789 A1* | 8/2013 | Atkinson | H02K 1/2773 310/156.67 |
| 2014/0232232 A1* | 8/2014 | Yamaguchi | H02K 1/2766 310/156.53 |
| 2014/0306569 A1* | 10/2014 | Kojima | H02K 1/2773 310/156.21 |
| 2015/0001975 A1* | 1/2015 | Nakazono | H02K 1/2773 310/152 |
| 2015/0216746 A1 | 11/2015 | Miyajima | |

FOREIGN PATENT DOCUMENTS

| | | | | |
|---|---|---|---|---|
| CN | 102810919 A | | 12/2012 | |
| DE | 10 2012 219 003 A1 | | 4/2014 | |
| DE | 102012219003 A1 | * | 4/2014 | ........... H02K 1/2773 |
| EP | 2 793 367 A1 | | 10/2014 | |
| EP | 2 991 194 A1 | | 3/2018 | |
| JP | 2006-311772 A | | 11/2006 | |
| KR | 10-1244574 B1 | | 3/2013 | |
| WO | 2013/176942 A1 | | 12/2013 | |
| WO | 2014047748 A1 | | 4/2014 | |

OTHER PUBLICATIONS

Patents Act 1977: Combined Search and Examination Report under Sections 17 and 18(3). UKIPO Application No. GB1600711.4, dated Jun. 22, 2018, 7 pp.

Patents Act 1977; Combined Searchand Examination Report under Sections 17 and 18(3), UKIPO Application No. GB31621298.7, dated Jun. 22, 2017, 7 pp.

International Search Report and Written Opinion of the International Searching Authority, International Application No. PCT/EP2018/081078, dated Jun. 9, 2017, 18 pp.

* cited by examiner

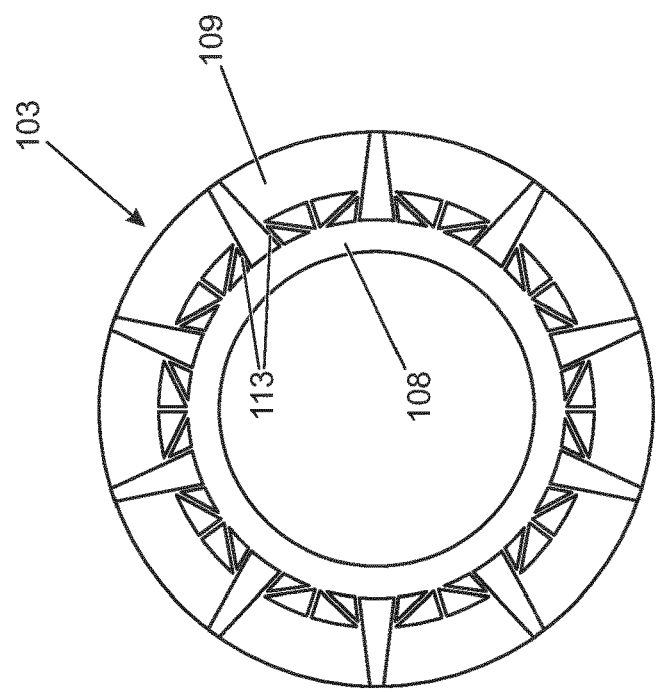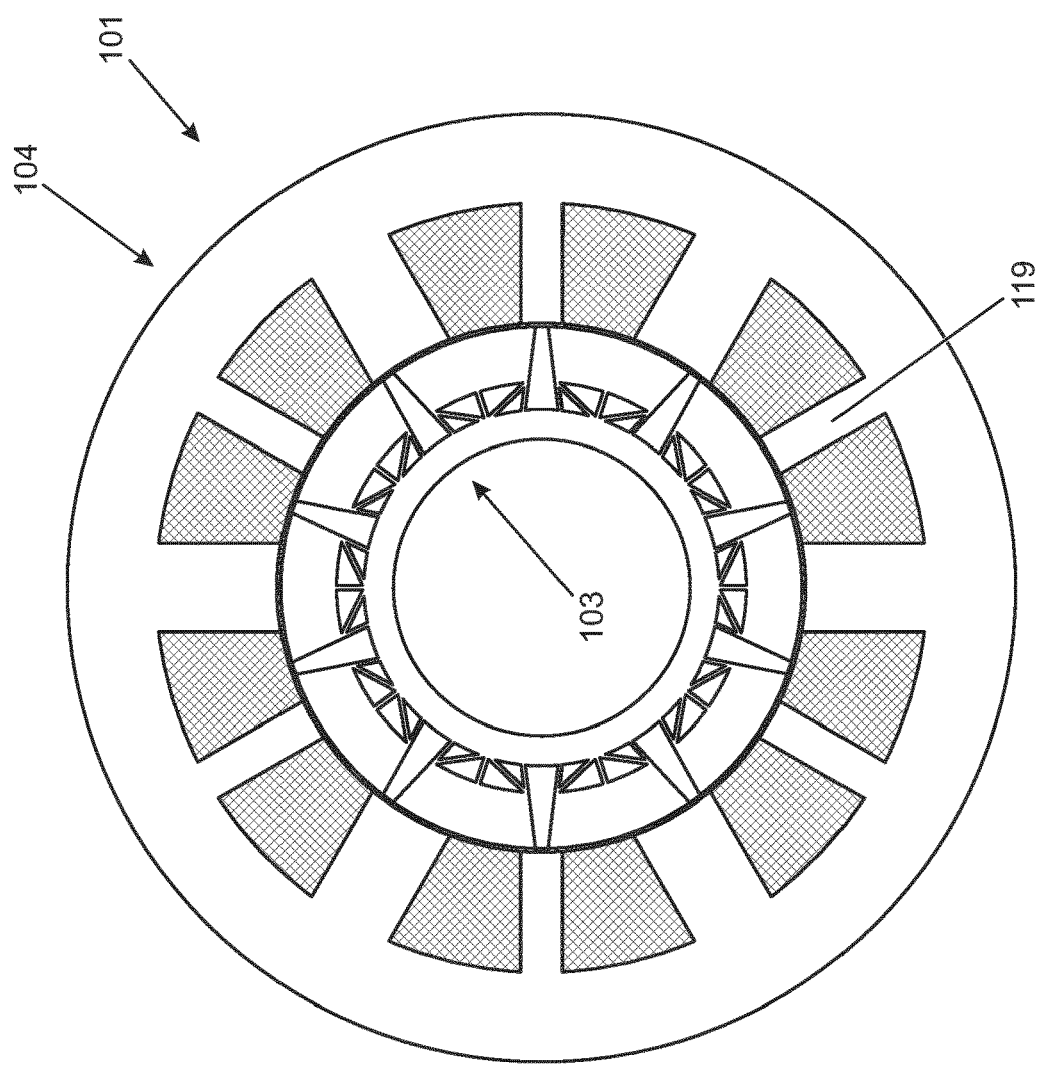
FIG. 10B
FIG. 10A

ROTOR FOR AN ELECTRIC MACHINE

RELATED APPLICATIONS

This application is a 35 U.S.C. § 371 national stage application of PCT Application No. PCT/EP2016/081078, filed on Dec. 14, 2016, which claims priority, from Great Britain Patent Application No. 1600711.4, filed on Jan. 14, 2016, the contents of which are incorporated herein by reference in their entireties. The above-referenced PCT International Application was published in the English language as International Publication No. WO 2017/121567 A1 on Jul. 20, 2017.

TECHNICAL FIELD

The present disclosure relates to an electric machine apparatus. More particularly, but not exclusively, the present disclosure relates to a rotor for an electric machine, to an electric machine and to a vehicle comprising an electric machine.

BACKGROUND

It is increasingly common to use electric machines to develop a tractive force to propel a vehicle, for example a hybrid electric vehicles (HEV) or an electric vehicle (EV). Permanent magnet motors can provide a high power density and efficiency suitable for these applications. However, these characteristics may rely on the use of high energy dense permanent magnets which reduce the required level of electric loading and the associated winding losses for a given power density. The permanent magnets made of rare earth elements, such as Neodymium Iron Boron (NdFeB), provide high power densities and good resistance to demagnetization. However, these types of permanent magnets are relatively expensive. The use of magnets comprising less or no rare earth elements, such as ferrite magnets, would be desirable at least in certain applications. However, there remain challenges in achieving sufficient levels of power density, while mitigating the demagnetization risk under field weakening and short circuit conditions. It is against this backdrop that the present invention has been conceived.

SUMMARY OF THE INVENTION

Aspects of the present invention relate to a rotor, to an electric machine and to a vehicle as claimed in the amended claims.

According to a further aspect of the present invention there is provided a rotor for an electric machine, the rotor comprising:
  a support frame comprising a centre section and a plurality of spokes, the spokes extending outwardly from said centre section;
  wherein each spoke comprises at least first and second bridge elements formed by one or more flux barrier, the first and second bridge elements being configured to control magnetic flux leakage into said centre section. The first and second bridge elements form magnetic flux leakage paths from the spokes to the centre section of the support frame. The reluctance of the flux path to the centre section is increased and magnetic flux leakage may be reduced. In certain embodiments, the first and second bridge elements may become saturated. By controlling the flux leakage into the centre section, the flux density in an airgap between the rotor and a stator may be improved. The torque characteristics of the electric machine may be improved via flux concentration.

The first and second bridge elements may be configured to become saturated and to inhibit magnetic flux leakage into the centre section. The elongated profile of said first and second bridge elements reduces their capacity to convey magnetic flux and they may become at least partially saturated. The first and second bridge elements may each have an elongated profile. Each bridge element may have a small cross-sectional area. The width of each bridge element may be small compared to the length of that bridge element. The first and second bridge elements may be elongated along the flux lines of an associated permanent magnet. The bridge elements may have a reduced cross-sectional area in order to promote magnetic saturation.

The centre section may be configured to be coupled to an output shaft of the rotor. An aperture can be formed in the centre section for receiving the output shaft. The centre section can have an annular shape. Inner flux barriers may be disposed in the centre section of the rotor. For example, one or more of said inner flux barriers may be radially inset from the base of each of said spokes. The inner flux barriers may be arranged within the centre section to reduce flux leakage.

The first and second bridge elements may connect each spoke to the centre section of the support frame. The spokes may each comprise a radially inner section and a radially outer section. The first and second bridge elements may be formed in the radially inner section of each spoke. In particular, the first and second bridge elements may be formed at the base of each spoke. The first and second bridge elements may connect each spoke to the centre section of the support frame. The first and second bridge elements may provide a connection between the radially outer section of each spoke and the centre section of the rotor. The radially outer section of each spoke may have a substantially continuous section. The radially outer section of each spoke may form a pole of the rotor.

The first and second bridge elements are formed by the one or more flux barrier in the support frame. The one or more flux barrier may be formed in each spoke. The one or more flux barrier may be disposed between said first and second bridge elements. The one or more flux barrier may each comprise a cavity formed within the support frame. The one or more flux barrier may be bounded on all sides by the support frame. The formation of one or more cavity in the support frame may promote cooling of the rotor, for example allowing a gas to be circulated through the rotor. A plurality of flux barriers may be formed in each spoke.

The first and second bridge elements may be at least substantially symmetrical about a radial axis of the support frame. The first and second bridge elements may be inclined towards each other in a direction extending outwardly from said centre section.

The first bridge element may be a first lateral bridge element; and the second bridge element may be a second lateral bridge element. The spokes may each comprise a radial bridge element extending along a radial axis of the support frame. The first and second bridge elements may be disposed on respective sides of the radial bridge element. The first lateral bridge element may be disposed on a first side of the radial bridge element; and the second lateral bridge may be disposed on a second side of the radial bridge element.

The rotor may comprise one or more bracing element. The one or more bracing element may have a cross-sectional area which is smaller than that of the first and second bridge elements and/or the radial bridge element. The one or more bracing element may extend between said first and second bridge elements. The one or more bracing element may extend in a circumferential direction. The combination of a plurality of bridge elements and the one or more bracing element may form a lattice (grid) structure. The one or more bracing element may extend between the radial bridge element and said first bridge element and/or said second bridge element.

The support frame may be formed from a ferromagnetic material. The support frame may be a magnetically permeable structure. The support frame may be formed from electrical steel, for example.

The support frame may comprise a plurality of laminations, each lamination extending substantially perpendicular to a longitudinal axis of the rotor. The laminations may each be formed from a sheet material, for example by pressing or cutting. The laminations may be single-piece rotor laminations. The single-piece rotor laminations may each define a section of the rotor. The single-piece rotor laminations may each define the centre section and the spokes. The laminations may be arranged in a stack to form a laminated core.

The rotor may comprise a plurality of permanent magnets. The permanent magnets may be mounted in said support frame between the spokes. The first and second bridge elements may be configured to control magnetic flux leakage from said permanent magnets into said centre section. One of said permanent magnets may be mounted between each pair of adjacent spokes. The permanent magnets may each comprise a section which is tapered inwardly towards a centre of the rotor. The tapered section may be in the form of an isosceles trapezoid, for example. The rotor may comprise a plurality of inserts for retaining said permanent magnets in the rotor. The inserts may be disposed between said spokes. The inserts may be made of a non-magnetic material.

The permanent magnets may be mounted in the rotor such that the magnetization direction of each permanent magnet extends substantially perpendicular to a radial direction of the rotor, i.e. in an azimuthal (circumferential) direction. The permanent magnets may be mounted in the rotor such that the magnetization directions are arranged in alternating clockwise/anticlockwise azimuthal directions. This mounting arrangement establishes an alternating radially inward/outward flux direction in said spokes.

A flux barrier may be formed between each said permanent magnet and the inner section of said rotor to control magnetic flux leakage into said centre section. The flux barrier may be formed by an inner cavity formed between each said permanent magnet and the centre section of the rotor. The inner cavity may be formed in a radially inner portion of a rotor slot formed between adjacent spokes. The first and second bridge elements may form opposing first and second sides of said inner cavity. The first and second sides of said inner cavity may comprise an arc, for example a circular arc. The associated permanent magnet may form a side of said inner cavity. The inner cavity may be closed by the permanent magnet mounted between said adjacent spokes. Alternatively, a bracing element may extend between the first and second bridge elements forming opposing sides of the inner cavity. The bracing element may form a side of the inner cavity. The bracing element may, for example, extend substantially perpendicular to a radial centreline of the permanent magnet mounted between said adjacent spokes.

The spokes of the rotor may each comprise at least one secondary magnet. The at least one secondary magnet may comprise a permanent magnet. The at least one secondary magnet may be mounted in a radially inner portion of each spoke. As described herein, each spoke comprises at least first and second bridge elements formed by one or more flux barrier. The at least one secondary magnet may be mounted between said first and second bridge elements. The at least one secondary magnet may be adapted to saturate the magnetic flux in said first and second bridge elements. The one or more flux barrier may comprise an internal aperture. The at least one secondary magnet may be mounted in said internal aperture. The secondary magnets may be operative at least partially to saturate said first and second bridge elements to control magnetic flux leakage into said centre section.

The spokes may each comprise more than one of said secondary magnets. For example, the spoke may comprise said first and second bridge elements and a radial bridge element; a first secondary magnet may be mounted between the first bridge element and the radial bridge element; and a second secondary magnet may be mounted between the second bridge element and the radial bridge element. Alternatively, or in addition, first and second secondary magnets may be offset from each other within the spoke in a radial direction.

An inner flux barrier may be formed between each permanent magnet and the centre of the rotor. The inner flux barrier may be radially inset from said permanent magnet. The inner flux barrier may comprise an inner cavity. As described herein, the inner cavity may be formed between each permanent magnet and the inner section of the rotor. The inner cavity may be at least partially defined by the first and second bridge elements formed by one or more flux barrier. At least a portion of said at least one secondary magnet may be mounted in the spoke adjacent to said inner cavities. Thus, the secondary magnets may be at least partially aligned with said inner cavities in a circumferential direction. At least a portion of said secondary magnets may be disposed between the inner cavities formed between consecutive spokes.

The secondary magnets may each have a radial magnetic orientation. The secondary magnets may be mounted such that the magnetization direction of each secondary magnet extends in at least substantially radial direction. Thus, at least in certain embodiments, the magnetization direction of the secondary magnets may be at least substantially perpendicular to the magnetization direction of the permanent magnets mounted between the spokes. The secondary magnets could be oriented such that the magnetization direction of all of the secondary magnets is the same (either oriented in a radially inward direction or in a radially outward magnetic orientation). Alternatively, the secondary magnets may be oriented such that the magnetization direction of the secondary magnets alternates between radially inward and radially outward directions around the rotor. The secondary magnets may be arranged such that the magnetization direction of the secondary magnet in each spoke follows (or aligns with) the magnetic flux orientation in that spoke. In this arrangement, the magnets in each pole of the rotor are arranged to repel each other. At least in certain embodiments this arrangement may be advantageous. Alternatively, the secondary magnets may be arranged such that the magnetization direction of the secondary magnet in each spoke is in opposition to the magnetic flux orientation in that spoke.

The rotor may be suitable for use in a switched reluctance electric machine. The spokes may each form a rotor pole of the electric machine. The first and second bridge elements may be configured to control magnetic flux leakage into said centre section. The magnetic flux leakage may be a stator field, for example generated by a plurality of stator windings. In use, the stator windings may be selectively energized to drivingly rotate the rotor.

The permanent magnets could be rare earth magnets, such as Neodymium Iron Boron (NdFeB). In alternate embodiments, the permanent magnets may be ferrite magnets.

According to a further aspect of the present invention there is provided an electric machine comprising a rotor as described herein.

According to a still further aspect of the present invention there is provided a vehicle comprising an electric machine as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which:

FIG. 10A shows a plan view of a switched reluctance machine in accordance with an embodiment of the present invention; and FIG. 10B shows a plan view of the rotor of the switched reluctance machine shown in FIG. 8A.

DETAILED DESCRIPTION

An electric machine 1 in accordance with an embodiment of the present invention will now be described with reference to the accompanying Figures. The electric machine 1 has particular application as a traction motor in a vehicle 2 (illustrated in FIG. 7).

Figure 1A:
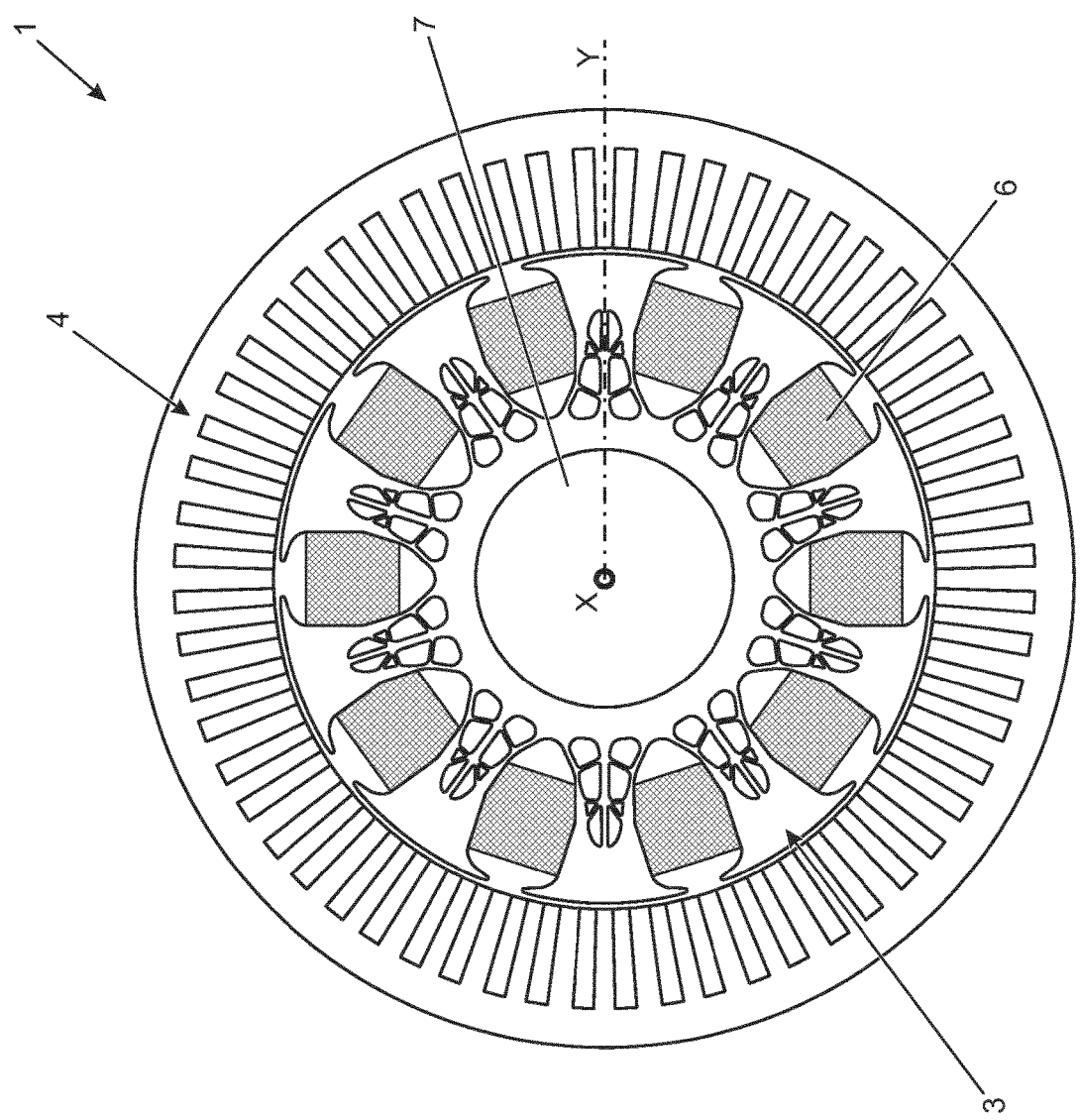
FIGS. 1A and 1B show an electric machine in accordance with an embodiment of the present invention.
Figure 1B:
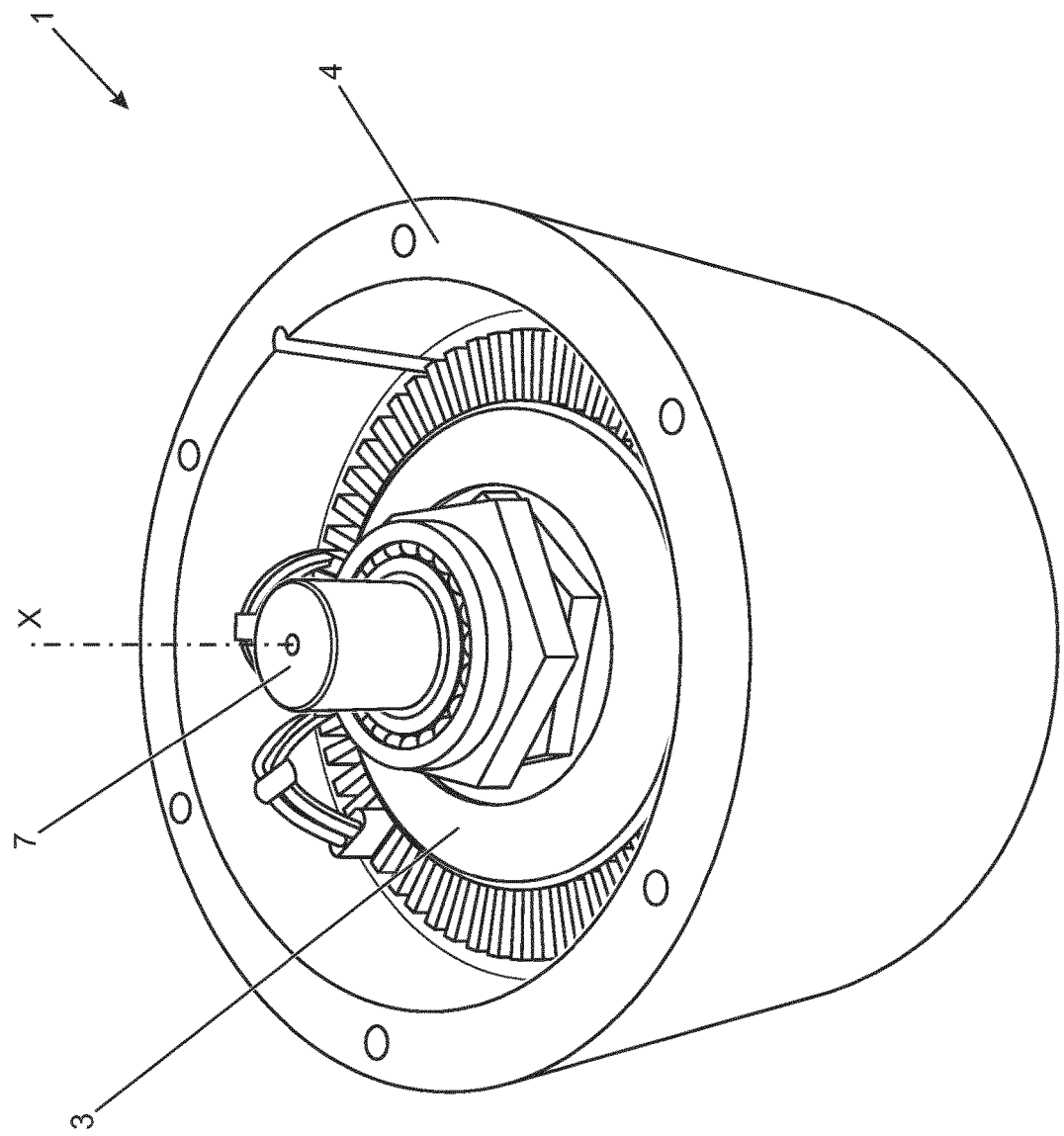
Figure 2:
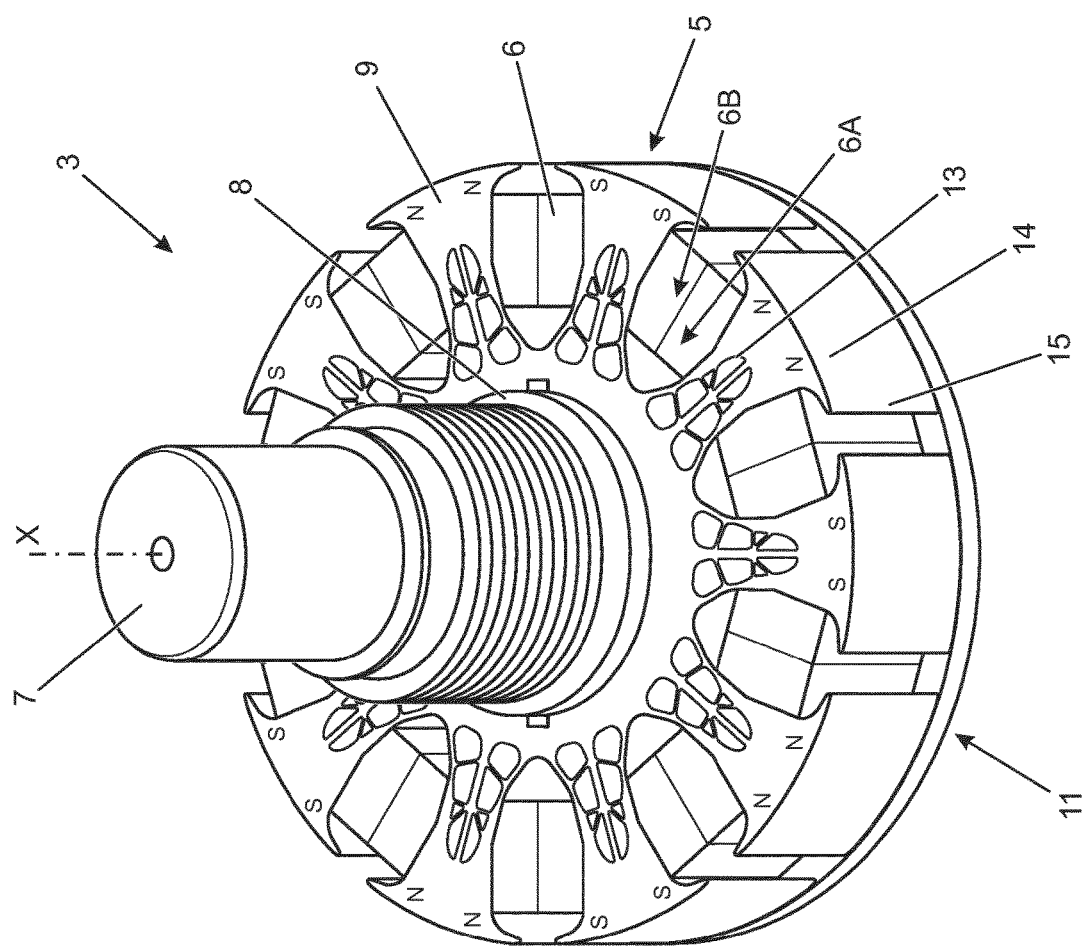
FIG. 2 shows a perspective view of a rotor of the electric machine shown in FIG. 1.
Figure 3:
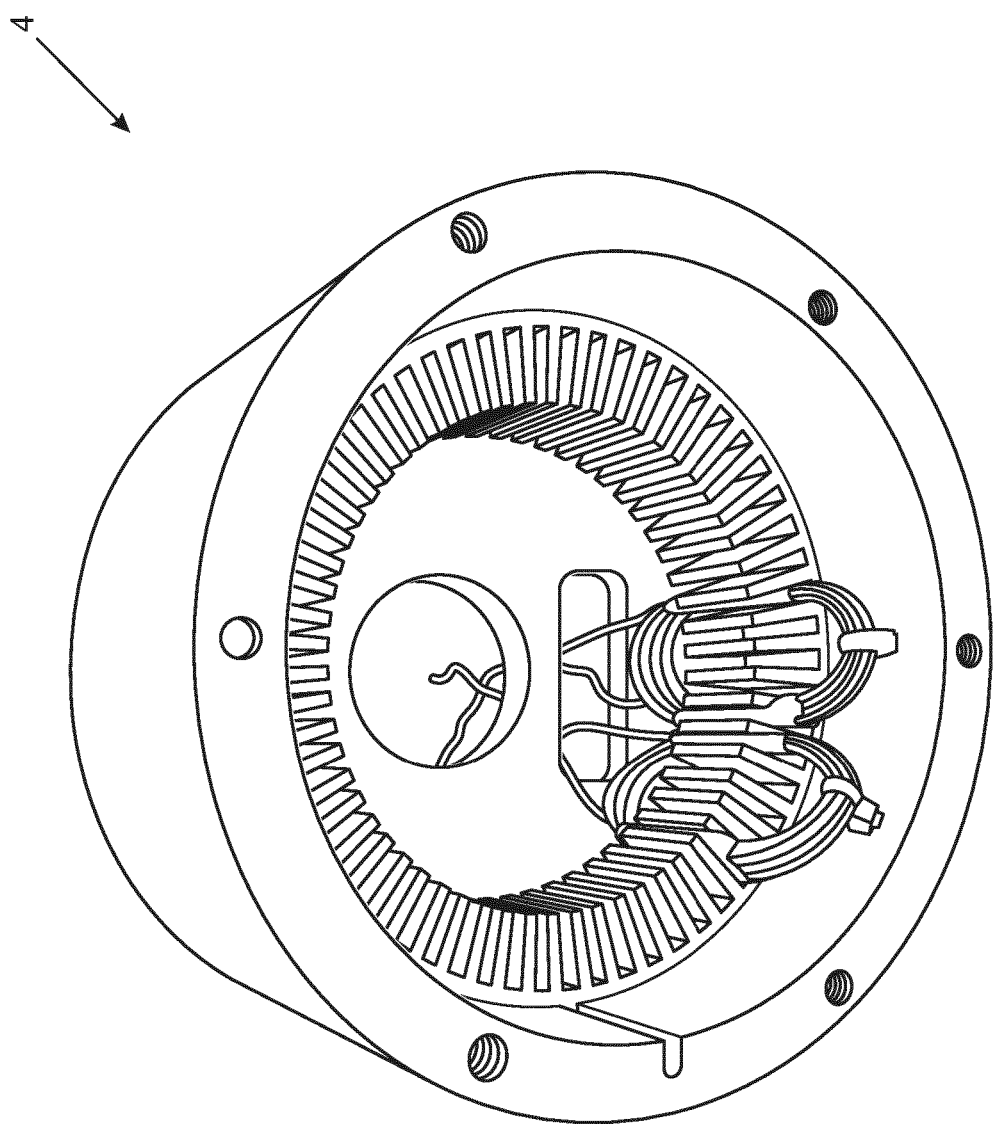
FIG. 3 shows a perspective view of a stator of the electric machine shown in FIG. 1.

The electric machine 1 comprises a rotor 3 and a stator 4. A plan view of the electric machine 1 is shown in FIG. 1A and a perspective view is shown in FIG. 1B. A perspective view of the rotor 3 is shown in FIG. 2; and a perspective view of the stator 4 is shown in FIG. 3. The electric machine 1 has a longitudinal (rotational) axis X (extending perpendicular to the plane of the page in FIG. 1A) about which the rotor 3 rotates. The electric machine 1 described herein has a base operating speed of 3000 rpm and a peak operating speed of 15000 rpm. The stator 4 is of conventional design and has an outer diameter of 205 mm. The rotor 3 has an outer diameter of 140 mm and a stack length of 195 mm. An airgap of 0.5 mm is provided between the rotor 3 and the stator 4.

With reference to FIG. 2, the rotor 3 is a ferromagnetic rotor comprising a support frame 5, a plurality of permanent magnets 6 and an output shaft 7. The support frame 5 comprises a centre section 8 and a plurality of spokes 9. The centre section 8 has a generally annular profile and comprises a central aperture 10 through which the output shaft 7 extends. The permanent magnets 6 are mounted in rotor slots 11 formed between adjacent spokes 9 in the support frame 5. In the present embodiment the rotor 3 comprises ten (10) of said permanent magnets 6. The permanent magnets 6 in the present embodiment are ferrite magnets, for example FB9B grade ferrite magnets, but may be composed of other materials.

The permanent magnets 6 have a substantially constant profile parallel to the longitudinal axis X of the rotor 3. The permanent magnets 6 each comprise a radially inner section 6A and a radially outer section 6B. In transverse section, the radially inner section 6A comprises an isosceles trapezoid which is tapered inwardly towards a centre of the rotor 3; and the radially outer section 6B is substantially rectangular.

The support frame 5 is composed of a ferromagnetic material. In the present embodiment, the support frame 5 comprises a plurality of single-piece rotor laminations arranged in a stack to form a laminated core. The laminations each have a unitary structure and may be formed from a sheet material, for example using a punch, a die or laser cutting. It will be appreciated that the laminations are arranged substantially perpendicular to the longitudinal axis X of the rotor 3. The laminations are made of M270-35A non-grain oriented electrical steel, but it will be appreciated that other materials may be used. The spokes 9 extend radially outwardly from the centre section 8 of the support frame 5. In the present embodiment, the rotor 3 comprises ten (10) of said spokes 9, but other rotor configurations are also contemplated.

Figure 4A:
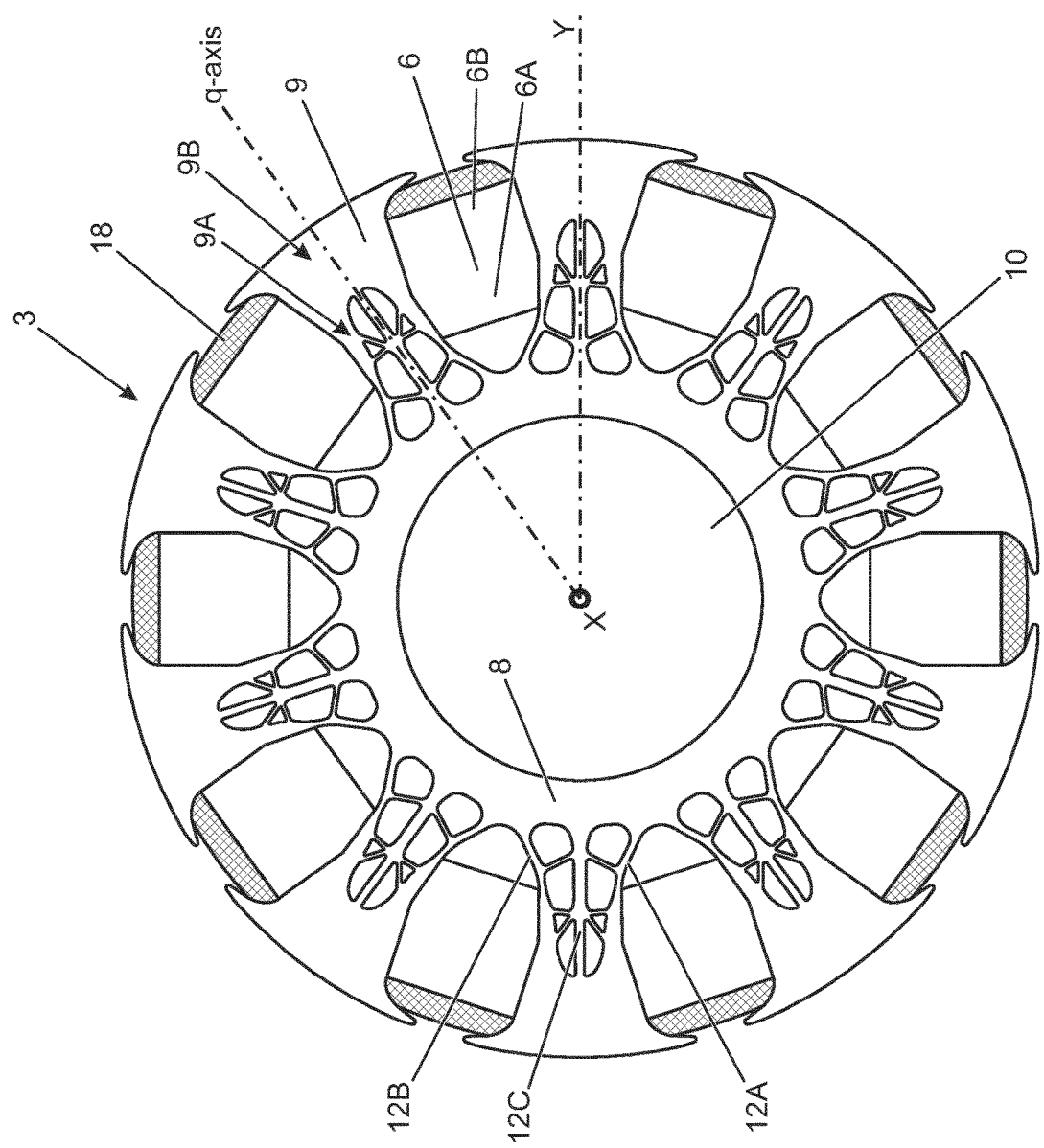
FIG. 4A shows a plan view of the rotor shown in FIG. 2.
Figure 4B:
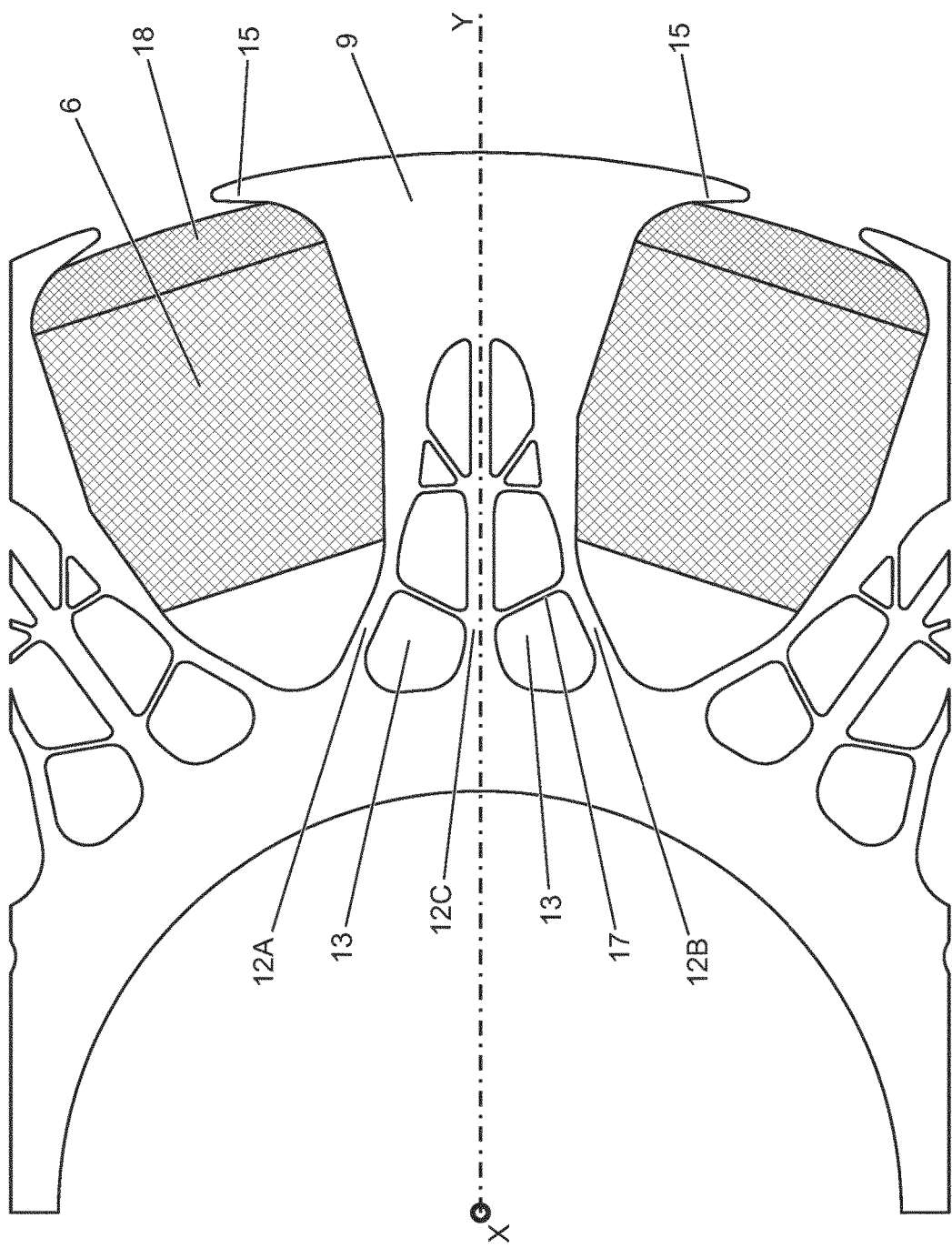
FIG. 4B shows an enlarged view of a section of the rotor shown in FIG. 2.

The spokes 9 have the same configuration and only one of said spokes 9 will now be described for the sake of brevity. With reference to FIGS. 4A and 4B, the spoke 9 comprises a radially inner section 9A connected to the centre section 8 of the support frame 5; and a radially outer section 9B disposed proximal to the stator 4. The radially inner section 9A comprises a plurality of bridge elements 12A-C connected to the centre section 8 of the support frame 5. The bridge elements 12A-C are defined by a plurality of flux barriers 13 formed within the support frame 5. The flux barriers 13 in the present embodiment are hollow voids (or cavities) formed in the spokes 9. The spokes 9 each comprise four (4) flux barriers 13 between the first lateral bridge element 12A and the radial bridge element 12C; and four (4) flux barriers 13 formed between the radial bridge element 12C and the second lateral bridge element 12B. The flux barriers 13 are arranged symmetrically about a radial axis Y of the rotor 3. As described herein, the bridge elements 12A-C are operable to control magnetic flux leakage from the permanent magnets 6 into the centre section 8 of the support frame 5. The radially inner section 9A comprises first and second lateral bridge elements 12A, 12B; and a radial bridge element 12C. The radial bridge element 12C extends along a radial axis Y of the rotor 3. The first and second lateral bridge elements 12A, 12B are disposed on respective sides of the radial bridge element 12C and arranged symmetrically about the radial axis Y. The first and second lateral bridge elements 12A, 12B are inclined inwardly towards each other as they extend outwardly from the centre section 8 of the support frame 5. The radially outer section 9B of the spoke 9 has a substantially continuous section and is adapted to promote flux density in the airgap between the rotor 3 and the stator 4. In particular, the radially outer section 9B forms a head 14 having circumferential extensions 15. The spokes 9 are profiled such that the rotor slots 11 form an inner cavity 16 between the permanent magnet 6 and the centre section 8. The inner cavity 16 may also reduce magnetic flux leakage into the centre section 8.

A plurality of bracing elements 17 extend between the radial bridge element 12C and each of the first and second lateral bridge elements 12A, 12B. The flux barriers 13 are each bounded by sections of the support frame 5, specifically the bridge elements 12A-C and the bracing elements 17. The first and second lateral bridge elements 12A, 12B have a non-linear profile which substantially matches the profile of the sides of the permanent magnets 6. The bracing elements 17 are connected to the first and second lateral bridge elements 12A, 12B proximal to each change in profile in order to reduce localised structural loads within the support frame 5. As shown in FIG. 4, there are three (3) bracing elements 17 extending between the radial bridge element 12C and each of the first and second lateral bridge elements 12A, 12B. The bracing elements 17 form a lattice (grid) structure within the spoke 9.

As shown in FIGS. 4A and 4B, an insert 18 is disposed between a radial outer edge of the permanent magnets 6 and the circumferential extensions 15. The insert 18 is operative to inhibit radial movement of the permanent magnet 6. The insert 18 in the present embodiment is made of a plastics material and is profiled to match in the internal profile of the circumferential extensions 15.

The electric machine 1 described herein operates in conventional manner. It will be appreciated that, in use, the spokes 9 provide both mechanical and magnetic support for the permanent magnet 6 within the rotor 3. The primary considerations for optimising the electromagnetic characteristics of the rotor 3 were to increase the radial dimensions of the permanent magnets 6 to increase the airgap flux density and torque via flux concentration, while increasing the reluctance of the flux path to the centre section 8 to inhibit flux leakage. The bridge elements 12A-C form a magnetic flux leakage path to the centre section 8. In order to increase the reluctance of the flux path, the thickness of the bridge elements 12A-C is reduced, and their length increased (along the magnetic leakage flux path). Thus, the bridge elements 12A-C each have an elongated structure. The extension of the flux barriers 13 in the q-axis region (shown in FIG. 4A) is reduced to avoid decreasing the q-axis inductance. The primary considerations for optimising the structural characteristics of the rotor 3 were to minimize mass, to control radial and circumferential deflection, and to maintain structural loads below a predetermined threshold.

Figure 5:
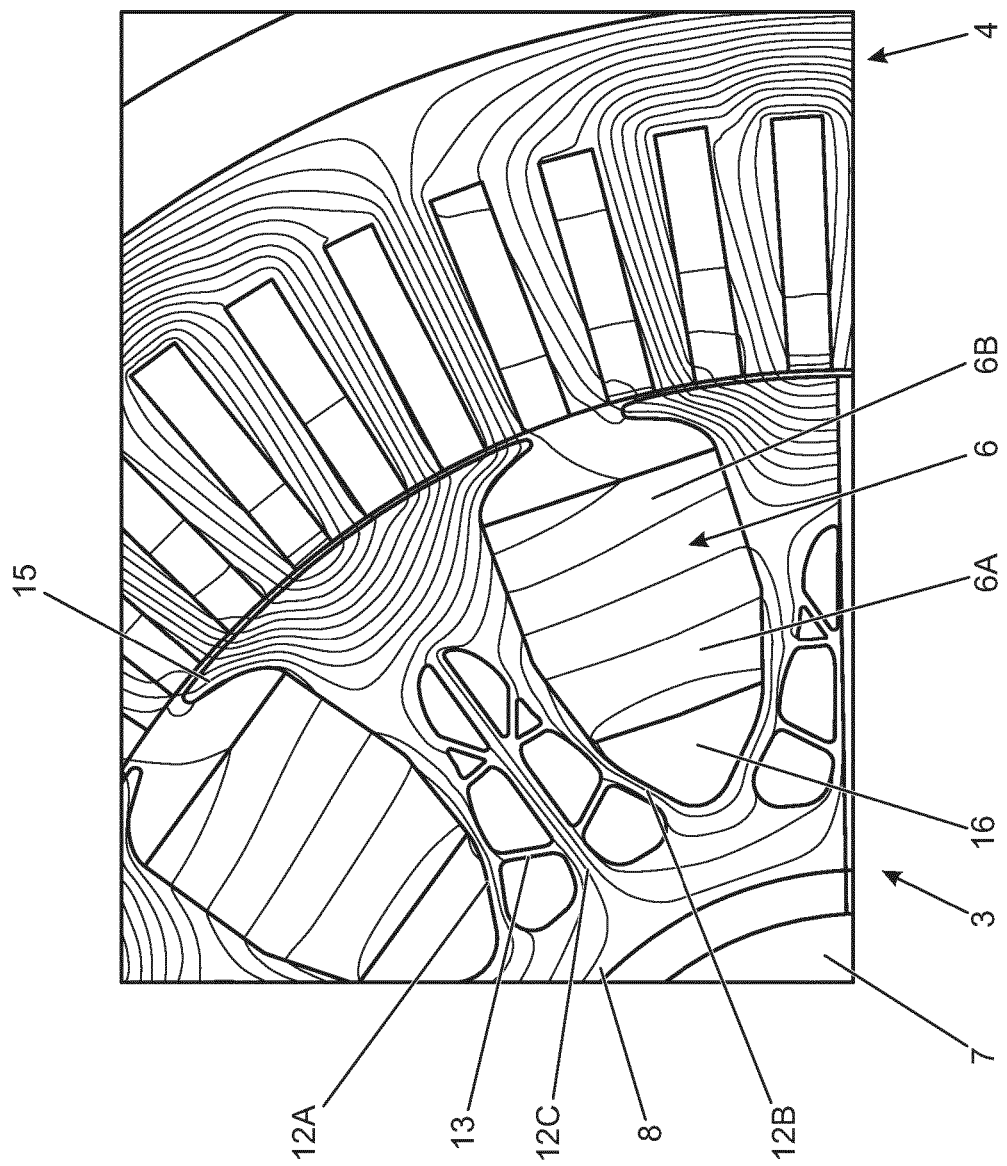
FIG. 5 is a graphical representation of the flux lines and flux density modelled in a segment of the rotor shown in FIG. 2.
Figure 6:
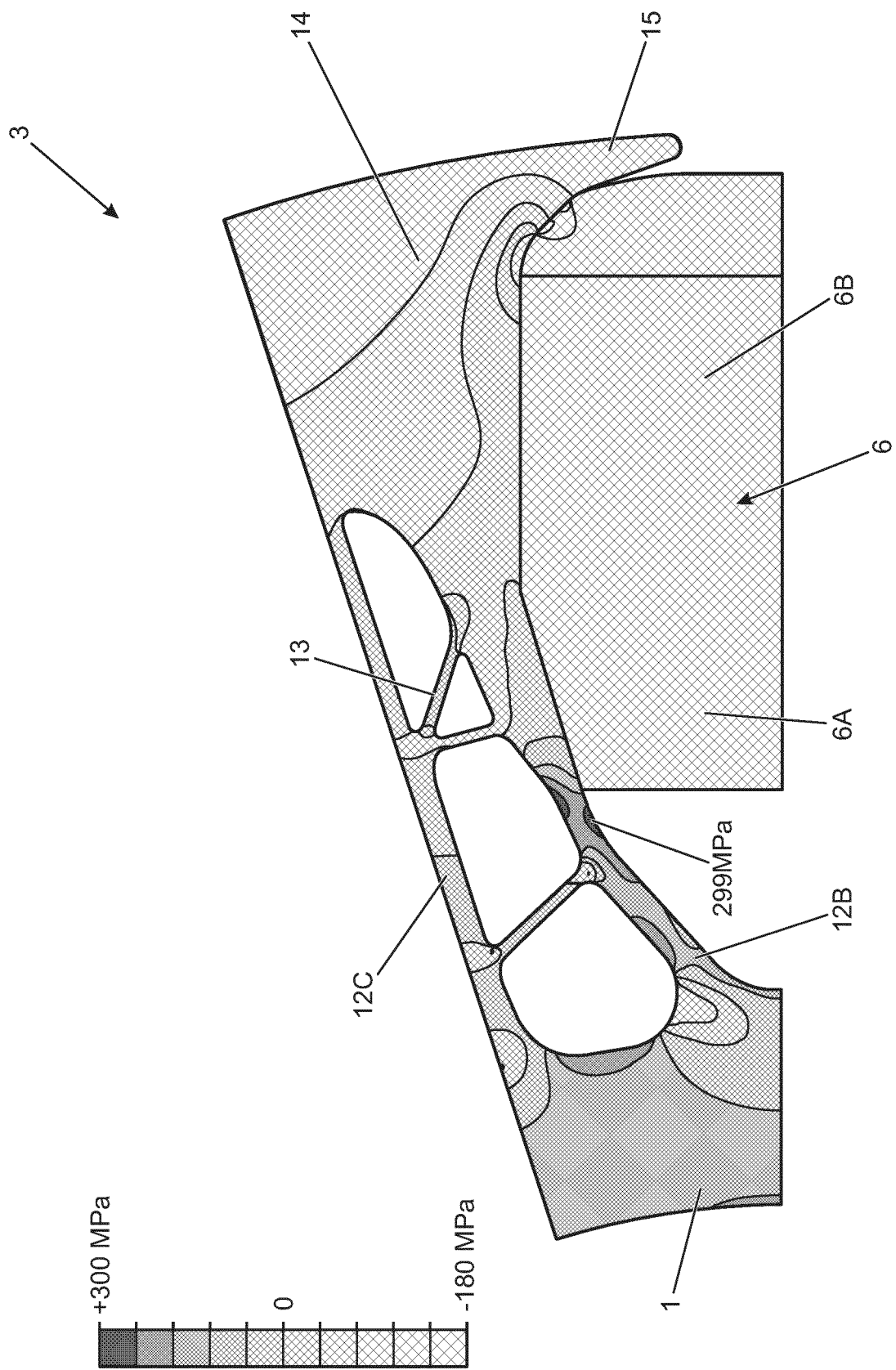
FIG. 6 is a graphical representation of the stress distribution modelled in a segment of the rotor shown in FIG. 2.

A graphical representation of the modelled flux lines and flux density within the rotor 3 is shown in FIG. 5. The flux barriers 13 are operative to inhibit flux leakage. The bridge elements 12A-C provide magnetic flux leakage paths from the permanent magnets 6 into the centre section 8 of the support frame 5, as illustrated by the flux lines shown in FIG. 5. However, due to reduced cross-sectional area, the bridge elements 12A-C become saturated and limit magnetic flux leakage into the centre section 8. As shown in FIG. 5, the magnetic flux within the first and second lateral bridge elements 12A, 12B is highest proximal to a radially inner edge of the permanent magnet 6. The magnetic flux is distributed more evenly along the length of the radial bridge element 12C. A graphical representation of the modelled stress distribution (MPa) in the rotor 3 is shown in FIG. 6. The structural loads within the first and second lateral bridge elements 12A, 12B is highest proximal to a radially inner edge of the permanent magnet 6.

Figure 7:
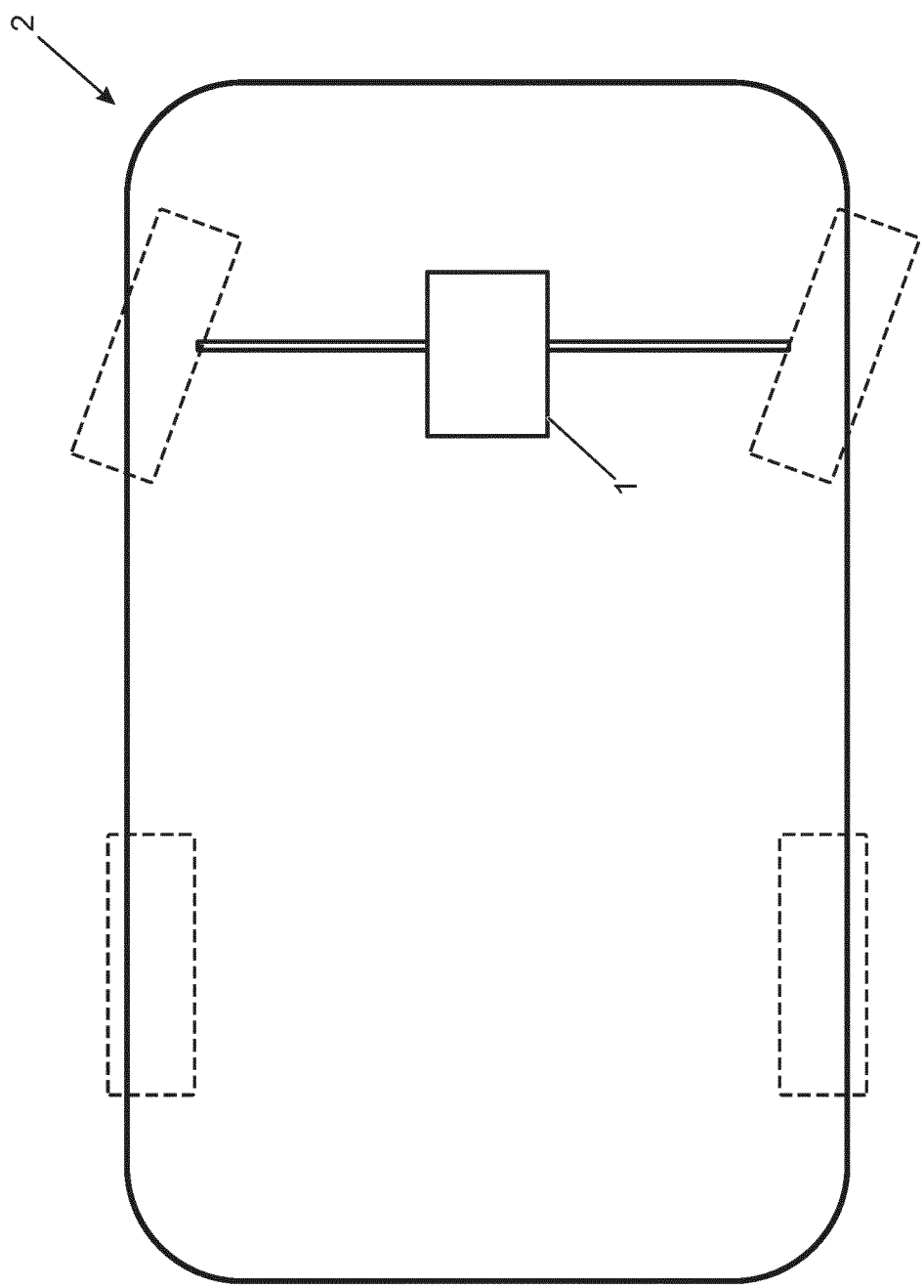
FIG. 7 is a schematic representation of a vehicle incorporating the electric machine shown in FIG. 1.

A schematic representation of the electric machine 1 installed in a vehicle 2 is shown in FIG. 7. The vehicle 2 may, for example, be an electric vehicle (EV), a hybrid electric vehicle (HEV) or a plug-in hybrid electric vehicle (PHEV). The electric machine 1 generates a tractive force for propelling the vehicle 2. A problem associated with the use of ferrite materials for the permanent magnets 6 in a traction motor is the possible demagnetization during field weakening or during a short circuit fault. At least in certain embodiments, the arrangement of the bridge elements 12A-C may provide improved resistance to demagnetization. The bridge elements 12A-C provide a ferromagnetic magnetic leakage path having a lower magnetic reluctance path (compared to an air void flux leakage path). This may reduce the influence of the demagnetization field on the permanent magnets 6.

The electric machine 1 may be liquid cooled, for example by circulating a liquid through a cooling jacket provided on the stator 4. In use, additional cooling could be provided by circulated air through the flux barriers 13.

It will be appreciated that various changes and modifications may be made to the electric machine 1 described herein without departing from the scope of the present application. The rotor 3 described herein consists of three of said bridge elements 12A-C in each spoke 9. It will be understood that each spoke 9 may consist of two (2) of said bridge elements 12A-C, for example by omitting the radial bridge element 12C. Alternatively, each spoke 9 may comprise more than three (3) of said bridge elements. In certain embodiments, the bracing elements 17 between the bridge elements 12A-C may be omitted. For example, the flux barriers 13 may extend continuously along the length of said bridge elements 12A-C.

Inner flux barriers 13 may be formed within the centre section 8 of the electric machine 1. The inner flux barriers 13 may be arranged within the centre section 8 further to reduce flux leakage from the permanent magnets 6. The inner flux barriers 13 may, for example, be radially inset from the base of the spokes 9. The inner flux barriers 13 may be disposed in the centre section 8 radially inset from the permanent magnets 6.

An electric machine 1 in accordance with a further embodiment of the present invention will now be described with reference to FIGS. 8 and 9. Like reference numerals are used for like components. The description herein is directed to the changes in the configuration of the rotor 3 in the present embodiment.

Figure 8:
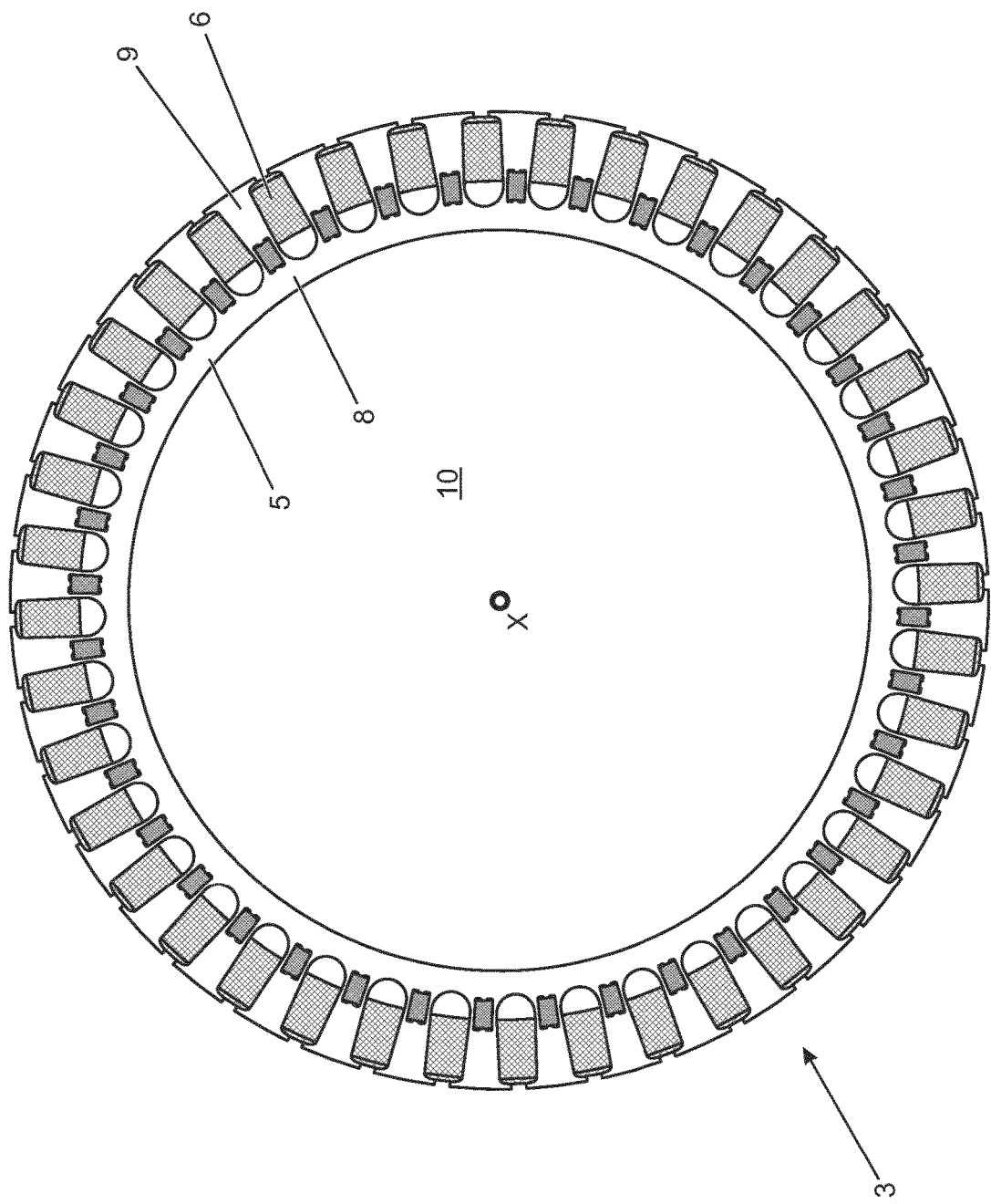
FIG. 8 shows a transverse section of a rotor according to a further embodiment of the present invention.
Figure 9:
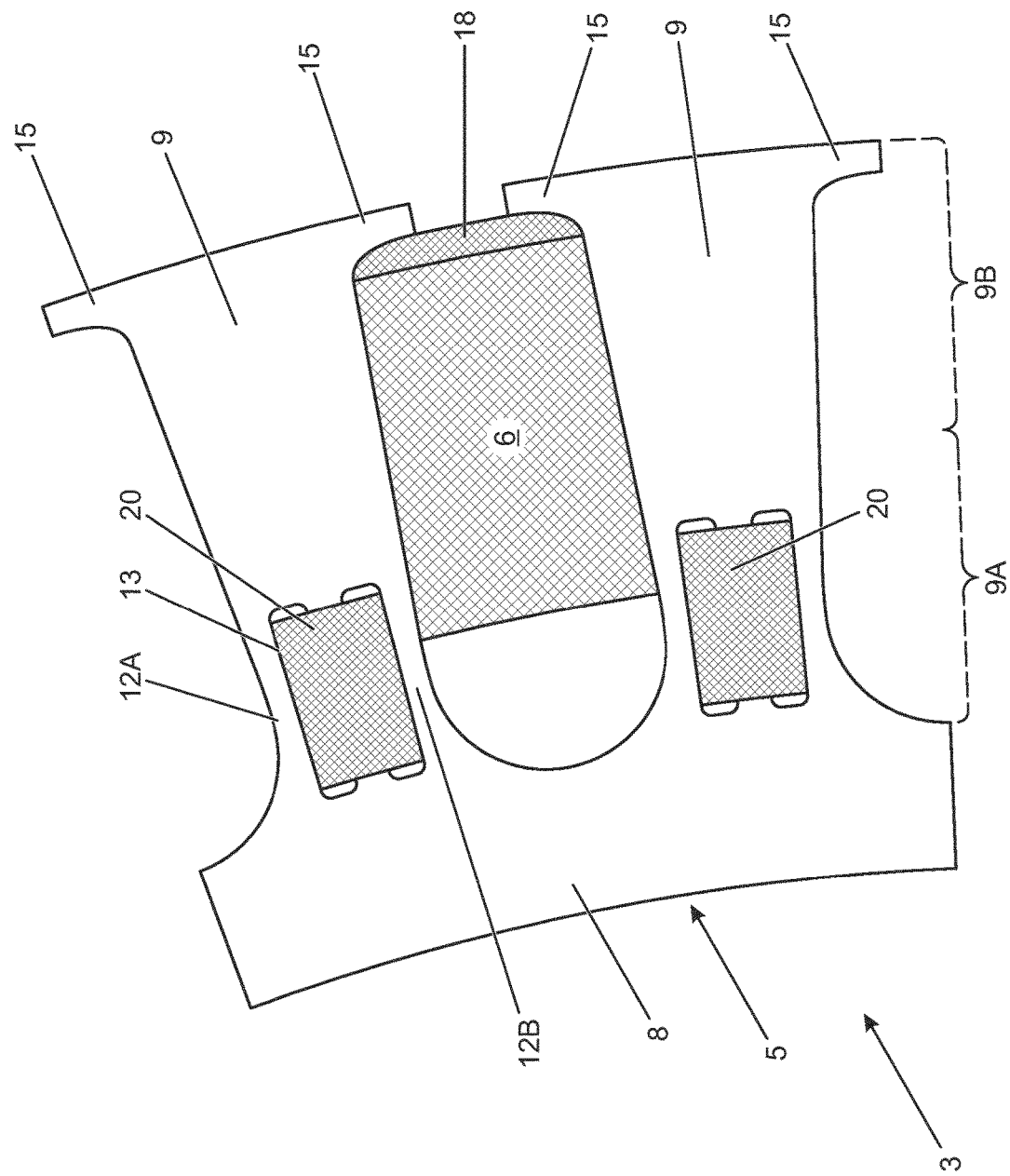
FIG. 9 shows an enlarged view of a section of the rotor shown in FIG. 8.

A sectional view extending transverse to a longitudinal (rotational) axis X of the rotor 3 is shown in FIG. 8. The rotor 3 is a ferromagnetic rotor comprising a support frame 5 and a plurality of permanent magnets 6. In the present embodiment the permanent magnets 6 are primary magnets for generating torque. The support frame 5 comprises a centre section 8 and a plurality of spokes 9. The centre section 8 has a generally annular profile and comprises a central aperture 10 through which an output shaft (not shown) extends. The permanent magnets 6 are mounted in respective rotor slots 11 formed between adjacent spokes 9 in the support frame 5. As shown in FIG. 8, the rotor 3 in the present embodiment comprises forty (40) of said permanent magnets 6 disposed between forty (40) spokes 9. The permanent magnets 6 in the present embodiment are ferrite magnets, for example FB9B grade ferrite magnets, but may be composed of other materials. The permanent magnets 6 have a substantially constant profile parallel to the longitudinal axis X. The permanent magnets 6 are each substantially rectangular in said transverse section, as shown in FIG. 9.

The spokes 9 of the rotor 3 each have the same configuration and only one of said spokes 9 will now be described for the sake of brevity. As shown in FIG. 9, the spoke 9 comprises a radially inner section 9A connected to the centre section 8 of the support frame 5; and a radially outer section 9B disposed proximal to the stator 4. The radially inner section 9A comprises first and second bridge elements 12A, 12B connected to the centre section 8 of the support frame 5. A secondary (saturating) magnet 20 is mounted between said first and second bridge elements 12A, 12B. The first and second bridge elements 12A, 12B are defined by a flux barrier 13 comprising an internal aperture formed in the spoke 9. In the present embodiment, the secondary magnet 20 is substantially rectangular in transverse section. A centreline of the secondary magnet 20 is disposed on a radius of the rotor 3.

As described herein in respect of the previous embodiment, the first and second bridge elements 12A, 12B are operable to control magnetic flux leakage from the permanent magnet 6 into the centre section 8 of the support frame 5. The secondary magnet 20 mounted in the flux barrier 13 is operative at least partially to saturate (magnetically) the first and second bridge elements 12A, 12B. Thus, at least in certain embodiments, the secondary magnet 20 may further reduce the magnetic flux leakage from the permanent magnets 6 into the centre section 8. The secondary magnet 20 may be considered as a sacrificial magnet insofar as they are not intended directly to increase the magnetic flux generated by the rotor 3. Rather, the secondary magnet 20 is arranged to reduce flux leakage from the permanent magnets 6 mounted between the spokes 9 of the rotor 3. The secondary magnets 20 may thereby control the magnetic flux generated by the permanent magnets 6 to increase the flux density in the airgap between the rotor 3 and the stator. The secondary magnets 20 may thereby indirectly increase the torque generated by the electric machine 1

The permanent magnets 6 are mounted in the rotor 3 such that the magnetization direction of each permanent magnet 6 extends substantially perpendicular to a radial direction of the rotor 3, i.e. in an azimuthal (circumferential) direction. The permanent magnets 6 are oriented in alternating clockwise/anticlockwise azimuthal directions. The permanent magnets 6 thereby encourage alternating radially inward/outward flux direction in the airgap. A pair of said permanent magnets 6 oriented such that the magnetization directions are oriented towards each other generates a radially outward flux direction in the airgap. A pair of said permanent magnets 6 oriented such that the magnetization directions are oriented away from each other generates a radially inward flux direction in the airgap. This configuration of the permanent magnets 6 is also used in the previous embodiment described herein.

In the present embodiment, the secondary magnets 20 are mounted in said spokes 9 such that the magnetization direction of each secondary magnet 20 is at least substantially radial (i.e. perpendicular to the magnetization direction of the permanent magnets 6). Thus, the secondary magnets 20 each have a radial magnetic orientation. The secondary magnets 20 could be oriented such that the magnetization direction of all of the secondary magnets 20 is the same (either a radially inward direction or a radially outward magnetic orientation). In the present embodiment, the secondary magnets 20 are oriented such that the magnetization direction of the secondary magnets 20 alternates between radially inward and radially outward directions around the rotor 3. More particularly, the secondary magnets 20 are arranged such that the magnetization direction of the secondary magnet 20 in each spoke 9 follows (or aligns with) the magnetic flux orientation in that spoke 9 generated by the adjacent permanent magnets 6. The secondary magnets 6 are oriented such that the polarity of the secondary magnets 6 follows the flux generated by the permanent magnets 6 in that spoke 9. In each spoke 9 in which the adjacent permanent magnets 6 are mounted such that the magnetization directions are oriented towards each other (i.e. to generate a radially outward flux direction in the airgap), the secondary magnet 20 in that spoke 9 is oriented such that the magnetization direction is radially outward. Conversely, in each spoke 9 in which the adjacent permanent magnets 6 are mounted such that the magnetization directions are oriented away from each other (i.e. to generate a radially inward flux direction in the airgap), the secondary magnet 6 in that spoke 9 is oriented such that the magnetization direction is radially inward. In this arrangement, the permanent magnets 6 and the secondary magnets 20 in each pole of the rotor 3 are arranged to repel each other. At least in certain embodiments, this may provide more effective bridge saturation.

An inner flux barrier comprising an inner cavity 16 is formed between the permanent magnet 6 and the centre section 8. The first and second bridge elements 12A, 12B are arranged to form opposing sides of the inner cavity 16. The outer walls of the first and second bridge elements 12A, 12B have a concave profile formed by at least one arc. In the present embodiment, said concave profile comprises a circular arc. The first and second bridge elements 12A, 12B form a semi-circular inner section of the inner cavity 16 which is arranged in opposition to an inner side of the permanent magnet 6. The inner cavity 16 may reduce magnetic flux leakage into the centre section 8 of the rotor 3. As shown most clearly in FIG. 9, a radially inner portion of each secondary magnet 20 is disposed between the adjacent inner cavities 16. Thus, the secondary magnets 20 at least partially aligned with said inner cavities 16 in a circumferential direction.

The spokes 9 each comprise circumferential extensions 15. As shown in FIG. 9, an insert 18 is disposed between a radial outer edge of the permanent magnets 6 and the circumferential extensions 15 to inhibit radial movement of the permanent magnet 6. The insert 18 in the present embodiment is made of a plastics material and is profiled to match the internal profile of the circumferential extensions 15.

In a variant, the secondary magnets 20 are arranged such that the magnetization direction of the secondary magnet 20 in each spoke 9 is in opposition to the magnetic flux orientation in that spoke 9 generated by the adjacent permanent magnets 6. The polarity of the secondary magnets 6 is in a repulsion mode to the flux generated by the permanent magnets 6 in that spoke 9. In each spoke 9 in which the adjacent permanent magnets 6 are mounted such that the magnetization directions are oriented towards each other (i.e. to generate a radially outward flux direction in the airgap), the secondary magnet 20 in that spoke 9 is oriented such that the magnetization direction is radially inward. Conversely, in each spoke 9 in which the adjacent permanent magnets 6 are mounted such that the magnetization directions are oriented away from each other (i.e. to generate a radially inward flux direction in the airgap), the secondary magnet 6 in that spoke 9 is oriented such that the magnetization direction is radially outward.

The arrangement of the bridge elements 12A-C and the flux barriers 13 have been described with reference to a permanent magnet electric machine 1. However, aspects of the invention described herein may be applicable to other types of motor, such as a switched reluctance machine. By way of example, a switched reluctance machine 101 is shown in FIG. 10A. Like reference numerals are used for like components, albeit increased by 100 for the sake of clarity.

The switched reluctance machine 101 comprises a rotor 103 and a stator 104. As shown in FIG. 10B, the rotor 103 comprises a plurality of spokes 109 each comprising a plurality of flux barriers 113. It will be understood that the rotor 103 of the switched reluctance machine 101 does not include permanent magnets disposed between the spokes 109. Rather, the rotor 103 is made of a magnetic material, such as electrical steel, and the spokes 109 each form a rotor pole. The stator 104 comprises a plurality of windings arranged to form stator poles 119. The stator poles 119 are selectively energized to generate a stator field which attracts with the rotor poles and drivingly rotates the rotor 103. In this application, the bridge elements 12A-C are adapted to control magnetic flux leakage from the stator field into the centre section 108 of the rotor 103. In the illustrated arrangement, the flux barriers 113 extend radially outwardly beyond those of the other embodiments illustrated herein. Furthermore, the lateral extent of the innermost flux barriers 113 is increased so as to extend laterally outwardly into the region of the centre section 108 radially inset from the permanent magnets 106. In the embodiment illustrated in FIGS. 10A and 10B, the flux barriers 113 extend circumferentially around the centre section 108 of the rotor 103.

The invention claimed is:

1. A rotor for an electric machine, the rotor comprising:
a support frame comprising a center section and a plurality of spokes, the spokes extending outwardly from the center section;
wherein each spoke comprises at least first and second bridge elements formed by one or more flux barrier, the first and second bridge elements being configured to control magnetic flux leakage into the center section; and
one or more bracing element extending between the first and second bridge elements.

2. The rotor as claimed in claim 1, wherein the first and second bridge elements are configured to become saturated and to inhibit magnetic flux leakage into the center section.

3. The rotor as claimed in claim 1, wherein the first and second bridge elements connect each spoke to the center section of the support frame, and wherein the first and second bridge elements each have an elongated profile.

4. The rotor as claimed in claim 1, wherein each spoke comprises a radial bridge element extending along a radial axis of the support frame, and wherein the first and second bridge elements are disposed on respective sides of the radial bridge element.

5. The rotor as claimed in claim 1, wherein each spoke comprises a radial bridge element extending along a radial axis of the support frame, and wherein the one or more bracing element extend between the radial bridge element and the first bridge element or the second bridge element.

6. The rotor as claimed in claim 1, wherein the one or more bracing element have a cross-sectional area which is smaller than that of the first and second bridge elements.

7. The rotor as claimed in claim 1, further comprising a plurality of permanent magnets mounted in the support frame between the spokes, and wherein the first and second bridge elements are configured to control magnetic flux leakage from the permanent magnets into the center section.

8. The rotor as claimed in claim 7, wherein the permanent magnets each comprise a section which is tapered inwardly towards a center of the rotor.

9. The rotor as claimed in claim 7, wherein an inner cavity is formed between each permanent magnet and the center section of the rotor to control magnetic flux leakage into the center section.

10. The rotor as claimed in claim 9, wherein the first and second bridge elements form opposing first and second sides of the said inner cavity, and wherein each permanent magnet forms a side of the inner cavity.

11. The rotor as claimed in claim 7, wherein the permanent magnets are mounted in the rotor such that the magnetization direction of each permanent magnet extends in an azimuthal direction.

12. The rotor as claimed in claim 11, wherein the permanent magnets are oriented in alternating clockwise/anti-clockwise azimuthal directions.

13. The rotor as claimed in claim 7, wherein each spoke of the rotor comprises at least one secondary magnet, Wherein each secondary magnet has a radial magnetic orientation and is oriented such that the magnetization direction of the secondary magnets alternates between radially inward and radially outward directions around the rotor.

14. The rotor as claimed in claim 13, wherein the at least one secondary magnet is mounted between the first and second bridge elements.

15. The rotor as claimed in claim 13, wherein each secondary magnet is arranged such that the magnetization direction of the secondary magnet in each spoke follows the magnetic flux orientation in that spoke.

16. The rotor as claimed in claim 13, wherein each secondary magnet is arranged such that the magnetization direction of the secondary magnet in each spoke is in the opposite direction to the magnetic flux orientation in that spoke.

17. The rotor as claimed in claim 1, wherein each of the spokes forms a rotor pole, and wherein the first and second bridge elements are configured to control magnetic flux leakage into the center section.

18. An electric machine comprising the rotor of claim 1.

19. A vehicle comprising the electric machine of claim 18.

* * * * *